United States Patent [19]

Misumi et al.

[11] 4,287,969
[45] Sep. 8, 1981

[54] MOTION SNUBBING DEVICE

[75] Inventors: Atsushi Misumi; Yoshio Kimura, both of Yokohama, Japan

[73] Assignee: NHK Spring Co., Ltd., Yokohama, Japan

[21] Appl. No.: 105,930

[22] Filed: Dec. 21, 1979

[51] Int. Cl.³ .............................................. B60T 7/12
[52] U.S. Cl. ..................................... 188/134; 74/764; 74/785; 248/DIG. 1; 248/58; 248/636
[58] Field of Search ............ 188/1 B, 134, 129, 77 W; 74/785, 789, 764; 248/DIG. 1, 58, 636

[56] References Cited

U.S. PATENT DOCUMENTS

| Re. 29,221 | 5/1977 | Yang |
| 2,353,370 | 7/1944 | Sears ................................. 74/789 X |
| 3,756,351 | 9/1973 | Sasaki |
| 3,876,040 | 4/1975 | Yang |
| 3,983,965 | 10/1976 | Wright, Jr. |
| 4,094,387 | 6/1978 | Pelat et al. .......................... 188/1 B |

Primary Examiner—George E. A. Halvosa
Attorney, Agent, or Firm—Frishauf, Holtz, Goodman & Woodward

[57] ABSTRACT

A motion snubbing device in which an internal gear is fixed on a shaft rotating in accordance with relative axial movement of a pair of support members, and an inertia mass is rotated by operation of a planetary gearing mechanism with the internal gear as an input gear thereof on its own axis. When the level of drastic external force applied to the device exceeds a critical value, the planetary gearing mechanism starts revolving induced by retarded rotation of the inertia mass. An actuating lever connected to the planetary gearing mechanism applies initial force for constrictive winding to a clutch spring which is normally at a standstill, thereby causing the spring to wind automatically around a brake drum fixed on the shaft so that the shaft is prevented from rotation through the drum.

7 Claims, 4 Drawing Figures

MOTION SNUBBING DEVICE

BACKGROUND OF THE INVENTION

This invention relates to a motion snubbing device interposed between a supporting structure and a body to be supported, allowing slow relative displacement of them, and restraining displacement attributable to drastic external force.

Snubbing devices of this type, which are generally provided for piping systems in chemical plants, power plants, etc., tend to restrain pipes from being damaged or broken, preventing drastic movement of the pipes when any external force such as earthquake shock is applied thereto, while allowing slow movement of the pipes attributable to pipe temperature changes, etc.

Heretofore, there have been proposed many such snubbing devices. In the main, devices which utilize the force of inertia, especially large-capacity ones with vibration damping capability, have great external dimensions and weight, and their bodies are liable to cause resonance, requiring addition of some damping means to counter such effect.

Among those devices which combine a clutch spring or torsion spring with a brake drum for braking operation besides utilizing the force of inertia, large-capacity devices are great in size and weight since the frictional resistance on the brake surface is in such direction as to check the braking action of the device due to the winding direction of the spring. Thus, these conventional devices lack the ease of carriage as well as of attaching and detaching, and cost high.

SUMMARY OF THE INVENTION

Accordingly, the object of this invention is to provide an improved motion snubbing device which can eliminate the aforesaid various drawbacks of the prior art devices and has large-capacity vibration damping capability despite the compactness and light weight.

In order to attain the above object, the device of this invention is so constructed that an inertia member is rotated by the rotation of a planetary gearing mechanism on its own axis which accompanies the rotation of a shaft caused by the axial movement of one support member relative to the other support member when the relative movement of these support members is slow. The inertia member can be rotated at faster speed than the shaft. Moreover, a brake drum of a brake means is mounted on the shaft, and a torsion spring or springs are wound around the drum normally with a narrow spacing from the brake surface of the drum and are normally at a standstill. Furthermore, an actuating lever is interposed between the torsion spring or springs and the planetary gearing mechanism. When the shaft is rotated with high acceleration by drastic external force applied to the paired support members, follow-up rotation of a sun gear is retarded by the force of inertia of the inertia member, thereby causing a planetary gear to revolve around the sun gear. Accompanying the revolution of the planetary gear, the actuating lever urges a spring end of the torsion spring in the wind-constricting direction against the biasing force of the torsion spring, thereby applying initial force for constrictive winding to the spring so as to bring the spring into contact with the brake surface of the brake drum.

The direction of the rotating drum is identical with the wind-constricting direction. Therefore, when the actuating lever applies only small force as the initial force for constrictive winding to the spring end in the wind-constricting direction, the spring automatically winds around the shaft. As a result, the actuating member need not apply large force to the spring, and the inertia member may be reduced in size. Further, a braking efficiency of approximately 100% can be obtained without slip of the spring on the brake surface.

According to the snubbing device of this invention, the internal components will never be subjected to any overload even if drastic external force is continuously applied to the device in one direction as is often the case with the practical use. Namely, when the drastic external force is continuously applied to the device in one direction and the planet gear revolves to cause the spring end pushing force of the actuating lever to reach the overload limit, the sun gear and inertia gear that are mounted freely on the shaft start rotating by reaction to cause the planet gear to rotate on its own axis, thereby reducing the pushing force of the actuating lever applied to the spring end. Accordingly, while the continuous, drastic external force is being applied in one direction, the force applied to the spring repeats fluctuations within an overload limit range. The spring which is not subjected to any force exceeding the overload limit is little likely to be damaged, nor will be locked the device.

Thus, in the device according to the invention, reduction of the inertia mass or member in diameter, as well as increase in braking force, can be achieved with use of the planetary gearing mechanism and braking mechanism. Further, according to a preferred embodiment of the invention, the brake drum is cup-shaped so that the inertia mass may be rotatably confined in the drum, which leads to a saving of space and thence to the compactification of the device. Moreover, an internal gear as an input means for the planetary gearing mechanism, which also is cup-shaped, is secured to the shaft, and the sun gear and the planet gear in the planetary gearing mechanism are confined in the cup-shaped gear, which also leads to a saving of space.

Furthermore, the device of the invention has unique construction and effect as follows. That is, the torsion spring or springs of the brake means are actuated by means of the actuating lever which is operated by the planetary gearing mechanism. Also, by slightly constricting the spring in the same direction of the rotation of the brake drum fixed on the shaft, the spring may automatically wind around the brake surface of the drum accompanying the rotation of the drum, thereby achieving high braking efficiency.

DETAILED DESCRIPTION OF THE INVENTION

Figure 1:
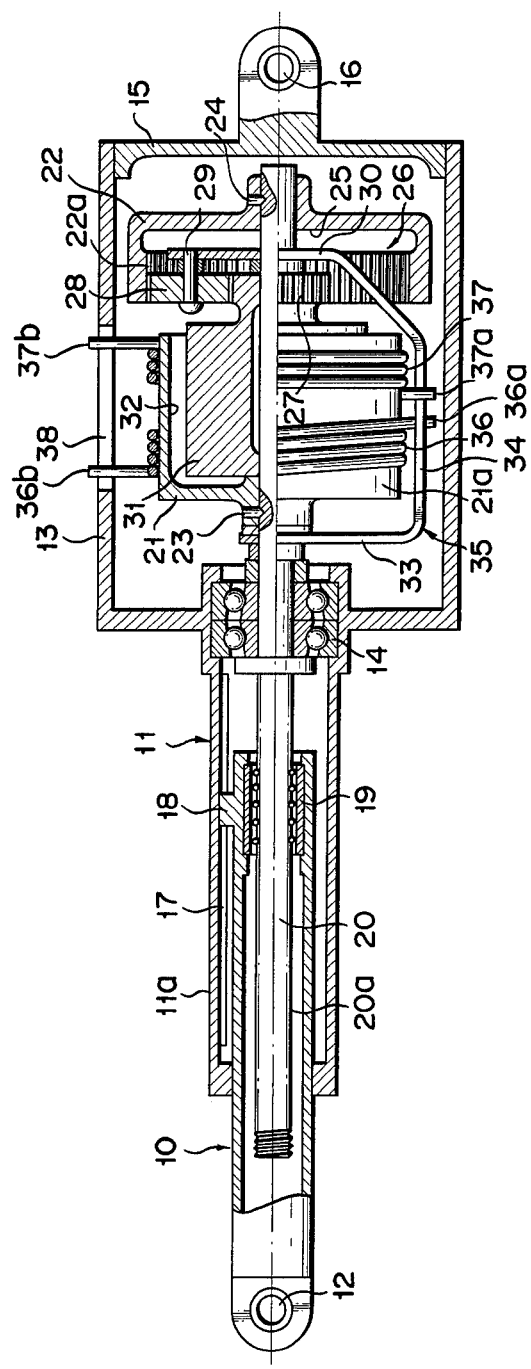
FIG. 1 is a profile of a motion snubbing device according to this invention.

Referring now to the drawing of FIG. 1, there is shown a motion snubbing device which includes a pair of support members 10 and 11 capable of relative axial movement. One such member 10 (hereinafter referred to as the first member) is cylindrical, and has a fitting hole 12 formed at its closed end portion. The first member 10 is attached to a member to be supported (not shown), such as e.g. a pipe in a piping system set in a power plant.

The other member 11 (hereinafter referred to as the second member) is composed of a cylindrical portion 11a in which the first member 10 is fitted so as to move in the axial direction, a large-diameter cylindrical housing 13, bearings 14 on the boundary between the housing 13 and the cylindrical portion 11a, a cap member 15 to close the opening end of the housing 13, and a fitting hole 16 defined in a fitting end portion formed integrally with the cap member 15. The fitting hole 16 is attached to a supporting structure (not shown) such as e.g. a structure in the power plant.

A number of such motion snubbing devices are provided for the piping system of the power plant as aforesaid, interposed between pipes of the piping system and the structure. Thus, the pipes are prevented from highly accelerated motion when they are subjected to any drastic external force such as earthquake shock, while being allowed to enjoy slow movement that may be caused by temperature changes of the pipes, etc., so that they may be kept from being damaged or broken.

A key 18 formed on the outer peripheral surface of the first member 10 engages a key way 17 formed in the inner peripheral surface of the second member 11 along the axial direction thereof, thereby restraining both these members from relative rotation and allowing relative motion only in the axial direction.

The first member 10 is fitted with a ball housing 19 confining therein a plurality of ball bearings which engage an externally continuously threaded portion 20a of a screw or first shaft 20 axially penetrating the first member 10.

The shaft 20 is rotatably supported by the bearings 14 so as to be prevented from axial movement. The axial movement of the first member 10 is converted into a rotation moment of the shaft 20 by means of the ball housing 19.

One end or nonthreaded end of the shaft 20 extends into the housing 13, and a cup-shaped brake drum 21 and a cup-shaped internal gear 22 are rigidly secured to the extended shaft portion at a distance from each other by means of setscrews or keys 23 and 24, respectively. The brake drum 21 and internal gear 22 are both confined in the housing 13, their opening ends facing each other.

Internal teeth 22a are formed on the inner periphery of the internal gear 22. A planetary gearing mechanism 26 is disposed in a hollow 25 of the gear 22. That is, the mechanism 26 comprises a sun gear 27 freely rotating on the shaft 20 and a planet gear 28 engaging both internal gear 22 and sun gear 27. One end of a rotating shaft 29 of the planet gear 28 is fixed to an arm 30 rockably supported on the shaft 20.

The internal gear 22 constitutes an input means for the planetary gearing mechanism 26.

The sun gear 27 is formed in a body with an inertia member 31, which is rotatably supported on the shaft 20. The outside diameter of the inertia member 31 may be made smaller than the inside diameter of the brake drum 21 defining a hollow 32, so that the inertia member 31 can be confined entirely in the hollow 32 of the brake drum 21.

The arm 30 constitutes a substantially U-shaped actuating lever 35 combining the arm 30 with another arm 33 rockably supported on the opposite side of the brake drum 21, and a web 34 which connects the two arms 30 and 33 crossing the shaft 20 and extends along the axial direction of the shaft 20.

Figure 2:
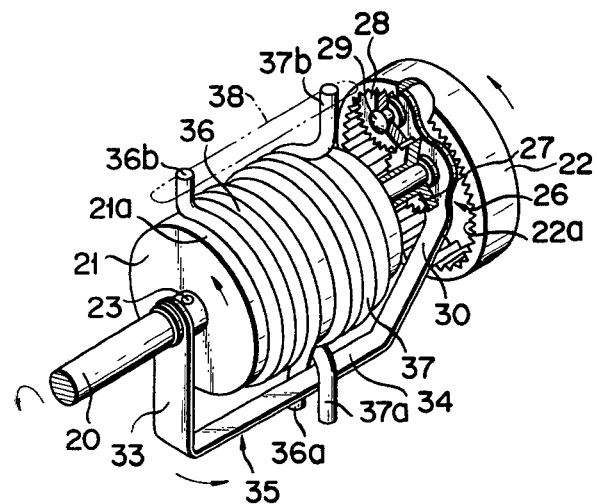
FIG. 2 is a perspective view particularly showing a planetary gearing mechanism and a brake drum assembly of the device of FIG. 1.

A pair of torsion springs 36 and 37 are oppositely wound around an outer peripheral brake surface 21a of the brake drum 21, aligning along the axial direction (FIG. 2). Both these springs are normally loosely wound with a narrow gap kept from the outer peripheral brake surface 21a of the brake drum 21, and held at a standstill. Each spring has two spring ends 36a and 37a or 36b and 37b which are bent to extend in the substantially radial direction. The two adjacent spring ends 36a and 37a out of the respective paired ends of the two springs 36 and 37 are anchored to the web 34 of the actuating lever 35 in opposite directions. Namely, as may be seen from FIG. 2, the web 34 is nipped by the spring ends 36a and 37a. The other corresponding spring ends 36b and 37b of the springs 36 and 37 are anchored to an opening or slot 38 bored through the wall of the housing 13. Extending along the axial direction of the shaft 20, the slot 38 is narrow and only a little wider than the diameter of the spring ends 36b and 37b. Accordingly, the spring ends 36b and 37b engaging the slot 38 are secured by the slot 38 with hardly any play.

When gentle axial force from the to-be-supported body (not shown) is applied to the motion snubbing device of this invention having the above-mentioned construction, the first member 10 starts an axial movement relative to the second member 11, thereby rotating the shaft 20 in the direction of an arrow in FIG. 2, for example.

Then, the brake drum 21 and the internal gear 22 rotate in the same direction with the shaft 20, as indicated by arrows. The rotation of the internal gear 22 corresponds to counterclockwise rotation indicated by a full line in FIG. 3. The springs 36 and 37 prevent through the actuating lever 35 the revolution of the planet gear 28 around the sun gear 27, so that the rotation of the internal gear 22 causes counterclockwise rotation of the planet gear 28 on its own axis, as indicated by an arrow of FIG. 3, and clockwise rotation of the sun gear 27. Since the sun gear 27 is rotated at higher speed than the internal gear 22 due to the gearing relationship, considerable inertia may be caused despite the low-speed rotation of the internal gear 22. Accordingly, the inertia member 31 may be confined fully in the hollow 32 of the brake drum 21 by reducing the outside diameter of the inertia member 31. This is conductive to the compactness of the device of the invention.

With such low-speed rotation of the shaft 20, the arm 30 will not practically rock. The reason is that the force in the rocking direction, which is applied to the arm 30 as the input gear 22 is rotated, still remains weak, so that the web 34 of the actuating lever 35 cannot move the anchored end of the torsion springs 36 and 37 against the urging force thereof.

Figure 3:
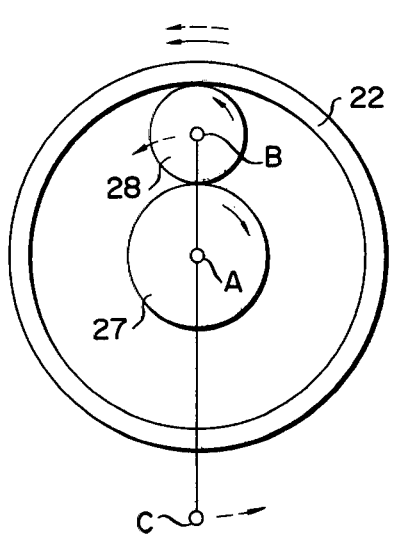
FIG. 3 is a diagram for illustrating the operation of the planetary gearing mechanism.

Referring to FIG. 3, if the center of the shaft 20 is A, the center of the shaft 29 of the planet gear 28 is B, and if the engaging point between the web 34 of the actuating lever 35 and the spring end is C, then the torque of the arm $\overline{AB}$ caused by the rotation of the internal gear 22 cannot get the better of opposite torque applied to the arm $\overline{AC}$ from the spring end, at the point C. Thus, the planet gear 28 will not revolve but turn the sun gear 27 while rotating on its own axis.

However, if drastic external force is applied to the device to rotate the shaft 20 with high acceleration, thereby rotating the internal gear 22 counterclockwise with high acceleration as indicated by a broken line of FIG. 3, for example, then the sun gear 27 in a body with the inertia member 31 cannot follow up the rotation of the internal gear 22. Thus, there is produced torque to revolve the planet gear 28, which is transmitted to the arms $\overline{AB}$ and $\overline{AC}$, and overcomes counter force applied to the point C from the spring end, thereby moving the points B and C in the direction indicated by broken lines. As a result, the spring 37 is pressed against the brake surface 21a of the brake drum 21. Then, the spring 37 automatically winds tight around the brake drum 21 since the winding direction of the spring 37 is one with the rotating direction of the drum 21. Thus, the brake drum 21 is prevented from rotation, and the rotation of the shaft 20 is restrained. This will interrupt the relative axial movement of the two support members 10 and 11 to check drastic movement of the to-be-supported body, e.g. pipe, thereby protecting the pipe from damage or breakage.

According to this invention, the critical value of force required for the arm 30 rocking against the urging force of the spring is set to a suitable value, after synthetic consideration of the frictional force existing in the planetary gearing mechanism 26, the inertia force of the inertia member 31, the lengths of the arms $\overline{AB}$ and $\overline{AC}$, and the urging force of the torsion springs 36 and 37.

Below the set critical value, the shaft 20 is allowed to rotate freely in accordance with the external force. Above the critical value, on the other hand, brake means or spring clutch means consisting of the brake drum 21 and the torsion springs 36 and 37 is actuated by initial force applied from the actuating lever 35, thereby preventing the rotation of the shaft 20.

Here it is to be noted that only one of the stationary paired torsion springs 36 and 37 that is wound in the rotating direction of the drum 21 winds around the drum 21 when the brake means is operated. If the rotation of the drum 21, that is, the rotation of the shaft 20 is reversed, then the other spring winds around the drum 21. Accordingly, highly secure and speedy braking action can be caused without regard to the rotating direction of the shaft 20 and drum 21.

Moreover, if drastic external force is continuously, unidirectionally applied to the snubbing device of this invention, the actuating lever 35 pushes the spring end 37a or 36a in the winding direction, receiving unidirectional rocking force. When the pushing force is increased to a certain degree, the sun gear 27, which is freely mounted on the shaft 20, starts to rotate together with the inertia member 31 by means of reaction to the pushing force. In consequence, the planet gear 28 also rotates on its own axis. Thus, the force of the actuating lever 35 to push the spring end will be increased no more, balancing at the increased lever. Accordingly, while the external force continues, the pushing force from the actuating lever 35 does not exceed the critical value, only repeating fine fluctuations within a limited increased-level range. Thus, effective snubbing motion may be obtained without causing damage to the springs and other parts and without locking the device meantime.

In the device of this invention, the aforesaid overload preventing function is obtained because the inertia member 31 and the sun gear 27 formed in one therewith are freely supported on the shaft 20.

Figure 4:
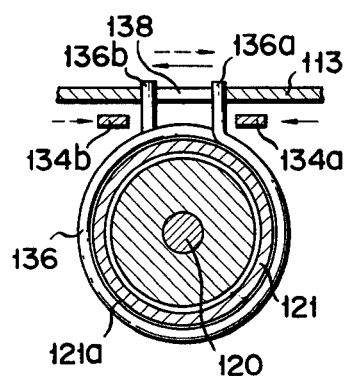
FIG. 4 is a sectional view showing a modification of the brake drum assembly.

Although the paired torsion springs 36 and 37 are used for the device of the above-mentioned embodiment of the invention, a single spring 136 as shown in FIG. 4 may also be used. In FIG. 4, 100 is added to the value of the reference numeral of each corresponding member shown in FIGS. 1 and 2 to provide numerals of three figures.

Referring now to FIG. 4, the single torsion spring 136 is normally loosely wound around an outer peripheral brake surface 121a of a brake drum 121 and held at a standstill, and both ends of the spring 136 penetrate a wide opening 138 formed in the wall of a housing 133, engaging the end edges of the opening 138 respectively. The torsion spring 136 is subjected to small pre-stress in the rewinding direction, so that both spring ends 136a and 136b are pressed against their corresponding end edges of the opening 138.

The web of the actuating lever is separated into two web portions 134a and 134b which are located in close vicinity to their corresponding spring ends 136a and 136b of the torsion spring 136.

When the shaft 120 is rotated in one direction with high acceleration by drastic external force to exceed the critical value, both web portions 134a and 134b are moved together, for example, in the direction of a full line by the rocking of the arm (not shown) of the actuating lever. Consequently, the spring end 136a corresponding to one web portion 134a is urged to bring the spring 136 into contact with the drum 121, thereby causing braking action.

If the shaft 120 rotates in the opposite direction with high acceleration, both portions 134a and 134b move together in the direction of a broken line, so that the spring end 136b corresponding to the other portion 134b is urged to bring the spring 136 into contact with the drum 121, thereby causing braking action.

According to this invention, therefore, there may be utilized either the paired torsion springs 36 and 37 as shown in FIGS. 1 and 2 or the single torsion spring 136 as shown in FIG. 4.

Although the brake drum 21 and the internal gear 22 are rigidly secured to the shaft 20 in FIG. 1, friction engagement may alternatively be employed so that the drum and internal gear may normally rotate together on the shaft. According to the device of the invention, as described above, continuous snubbing motion may be achieved without locking the device within a predetermined range of increased acceleration, so that the ends 36a and 37a of the springs 36 and 37 and other parts are saved from damage in most cases. Nevertheless, the device may be protected from damage by bringing the shaft 20 and drum 21 into the friction engagement as aforesaid even though further drastic external force is applied. The reason is that the drastic external force allows relative rotation of the drum 21 on the shaft 20 only in that case.

Further, in the above-mentioned embodiment, the slot 38 is formed in the wall of the housing 13 for anchoring the torsion springs 36 and 37. Instead of using such slot, however, any suitable fixed anchoring member may be disposed inside the housing.

Furthermore, the inertia member 31 and sun gear 27, which are solid in the above-mentioned embodiment, may be formed separately and coupled at assembly.

What is claimed is:

1. A motion snubbing device comprising:

a pair of telescoping support members mounted to reciprocate on each other along the axial direction thereof, while being restrained from relative rotation, when any force is applied from the outside;

means for converting the axial movement of one of the paired support members into a rotation moment;

a shaft supported by the other member to be rotated by said moment converting means;

an inertia member rotatable relatively to said shaft;

a planetary gearing mechanism interposed between said shaft and inertia member, said planetary gearing mechanism rotating on its own axis to rotate said inertia member with said shaft when gentle external force is applied;

a brake member mounted on said shaft and having a brake surface;

clutch spring means disposed around said brake surface and normally in a stationary state where said clutch spring means is disengaged from said brake surface; and actuating means disposed between said planetary gearing mechanism and clutch spring means, said actuating means being operated by said planetary gearing mechanism to revolve when drastic external force is applied and applying initial force to said clutch spring means for clutch engagement with said brake surface, whereby said shaft is prevented from rotation.

2. A motion snubbing device comprising:

a pair of telescoping support members mounted to reciprocate on each other along the axial direction thereof, while being restrained from relative rotation, when any force is applied from the outside;

means for converting the axial movement of one of the paired support members into a rotation moment;

a first shaft supported by the other member to be rotated by said moment converting means;

brake means mounted on said shaft;

a rotary inertia member rotatable relatively to said shaft;

a sun gear rotating together with said inertia member;

a planet gear engaging said sun gear;

a rotating shaft for said planet gear;

an input gear engaging said planet gear and rotating as said first shaft rotates;

an arm rockable coaxially with said sun gear and supporting the rotating shaft of said planet gear on a free end thereof; and actuating means connected to said arm and applying initial force for the start of braking to said brake means when large external force exceeding a critical value is applied, thereby causing braking action of said brake means to prevent said first shaft from rotation.

3. A motion snubbing device according to claim 2, wherein said brake means includes a brake drum secured to said first shaft and clutch spring means normally loosely wound around the outer periphery of said brake drum and held at a standstill.

4. A motion snubbing device according to claim 3, wherein said clutch spring means comprises a pair of torsion springs axially arranged and oppositely wound around the outer periphery of said brake drum.

5. A motion snubbing device according to claim 3, wherein said brake drum is cup-shaped, and the outside diameter of said inertia member is smaller than the inside diameter of said drum so that said inertia member may be substantially contained by said drum.

6. A motion snubbing device comprising:

a pair of telescoping support members mounted to reciprocate on each other along the axial direction thereof, while being restrained from relative rotation, when any force is applied from the outside;

means for converting the axial movement of one of the paired support members into a rotation moment;

a first shaft supported by the other member to be rotated by said moment converting means;

a brake drum secured to said first shaft;

a pair of torsion springs loosely wound around said drum in opposite directions and each having two spring ends, one spring end of each said spring being anchored to said other support member;

an input gear secured to said shaft;

a planet gear engaging said input gear, said planet gear having a rotating shaft;

a sun gear engaging said planet gear and rotatable on said first shaft;

an inertia member rotating relatively to said first shaft as said sun gear rotates;

a substantially U-shaped actuating lever formed of a pair of arms rockably mounted on said first shaft on opposite sides of said brake drum along the axial direction thereof and a web connecting said arms;

one of the arms of said actuating lever having an extended end to support the rotating shaft of said planet gear; and the other spring end of each said torsion spring being anchored to said web so as to hold said web from each side.

7. A motion snubbing device comprising:

a pair of telescoping support members mounted to reciprocate on each other along the axial direction thereof, while being restrained from relative rotation, when any force is applied from the outside;

means for converting the axial movement of one of the paired support members into a rotation moment;

a first shaft supported by the other member to be rotated by said moment converting means;

a housing formed on said other support member, one end portion of said first shaft extending into said housing;

a cup-shaped brake drum confined in said housing and secured to said first shaft, said drum having an outer peripheral brake surface;

a pair of clutch springs loosely wound around said brake drum in opposite directions and each having two spring ends;

an opening formed in the wall of said housing and engaged by one spring ends of said paired clutch springs;

an internal gear confined in said housing and secured to said first shaft;

a planet gear engaging said internal gear, said planet gear having a rotating shaft;

a sun gear engaging said planet gear and rotatable on said first shaft;

an inertia mass formed in a body with said sun gear and rotatable coaxially with said first shaft, said inertia mass being substantially confined in said brake drum; and an actuating lever supporting the rotating shaft of said planet gear and having an arm coaxially rockable with said sun gear, said actuating lever being engaged by the other spring ends of said paired clutch springs, whereby rocking movement of the arm of said actuating lever is substantially prevented, when the external force applied is within a fixed range of strength, so that said inertia mass rotates meantime, and the arm of said actuating lever rocks, when the external force applied exceeds said fixed range, to cause said actuating lever to urge the other spring end of one clutch spring so that initial force for clutch engagement is applied to said other spring end to bring said clutch spring into contact with the brake surface of said brake drum, thereby preventing said first shaft from rotation.

* * * * *